3,354,079
APPARATUS AND PROCESS FOR TREATING
A LIQUID WITH A GAS
Roger P. Van Driesen, Hopewell, N.J., assignor to Cities
Service Research and Development Company, New
York, N.Y., a corporation of New Jersey
Filed Mar. 3, 1964, Ser. No. 349,087
14 Claims. (Cl. 208—143)

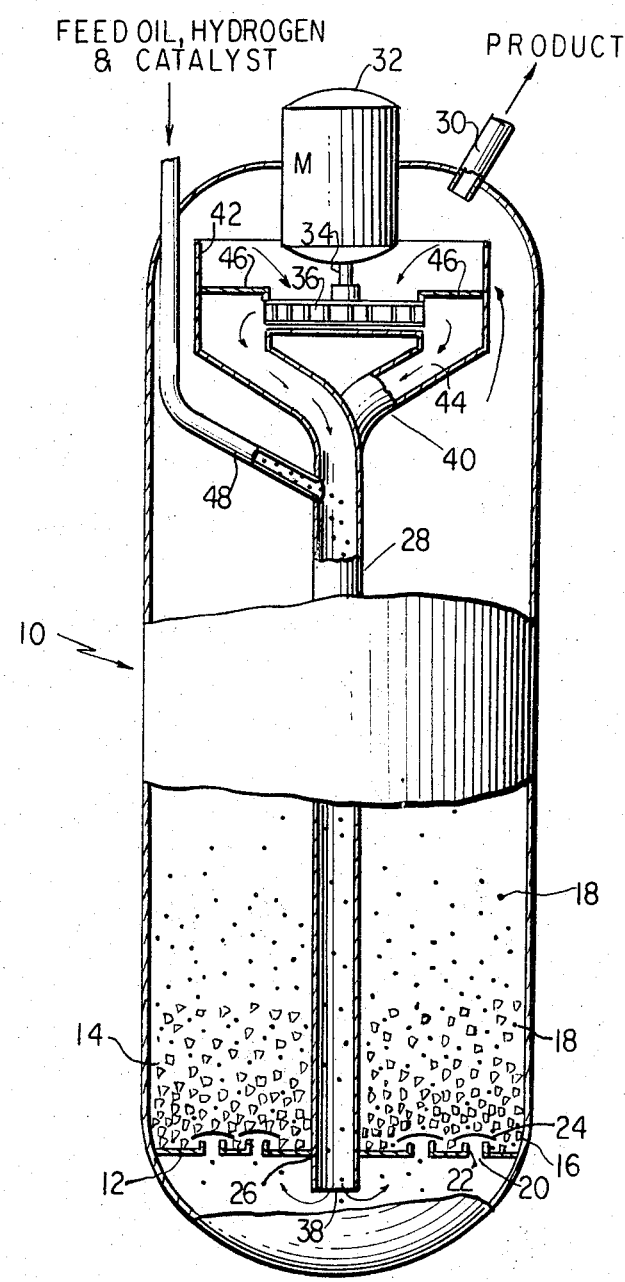

This invention relates to a process and apparatus for treating a liquid with a gas. More particularly it relates to such a process and apparatus for providing recirculation within a reactor and intimate contact between liquids and gases together with substantial freedom from product and reactant degradation.

In many applications it is desirable to provide recirculation of liquids within a reactor such as in the case of exothermic reactions between liquids and gases. To cite a few characteristic examples of exothermic reactions involving a liquid and a gaseous material, liquid organic compounds may be hydrogenated, liquid olefinic or aromatic compounds may be alkylated with gaseous or vapor phase isoparaffinic compounds, high molecular weight organic molecules may be hydrocracked to form saturated lower molecular weight organic compounds, organic compounds may partially be oxidized to form their oxygen derivatives, etc.

In a flowing stream, the temperature rise of exothermic reactions across the reaction zone is uneven. Thus in a flowing continuous exothermic reaction, if the inlet temperature to the reaction zone is proper, the outlet temperature will be too high or conversely, if the outlet temperature of the reaction zone is proper, the inlet temperature would be too low. This temperature gradient can often cause undesirable thermal side reactions such as decomposition of product or reactants.

To combat the temperature difficulties of exothermic reactions in continuous flowing reactors, many expedients have been devised such as the use of heat exchangers in the reaction zone, installation of a stirrer in the reaction zone to produce thorough mixing of the reacting mixture, and the use of conventional recycle lines and pumps. These expedients, however, suffer from various shortcomings such as inefficiency, high cost of installation or maintenance and restrictions on the reaction conditions which may be employed.

More recently there has been disclosed the use of a vertical open ended conduit or recirculation tube within the reactor together with means for disengaging gas from the liquid at the top of the conduit so that liquid in the conduit will have a higher density than the fluid in the reactor and thus maintain circulation. The use of such an internal recirculating conduit possesses many advantages over the heretobefore discussed techniques for controlling temperature within a reactor. However, that technique suffers from certain shortcomings since the liquid in the conduit is maintained under reaction conditions but out of contact with the gaseous reactant. This causes degradation of the liquid reactant and products and in certain cases such as the hydrogenation of heavy hydrocarbons it causes production of resinous degradation products which can render the process inoperable. This problem is particularly evident when the reaction is conducted in the presence of a solid catalyst and the recirculating liquid is thus out of contact with both the gaseous reactant and catalyst during its passage in the conduit.

It is an object of this invention to provide an improved process and apparatus for treatment of a liquid with a gas.

It is a further object of this invention to provide a process and apparatus for eliminating or inhibiting degradation of liquid products and reactants recirculating within a recirculation tube in a reactor in which an exothermic reaction is conducted by contacting a liquid with a gas.

It is still a further object of this invention to provide a process and apparatus for decreasing the amount of degradation of liquid reactants in an exothermic process and for increasing the periods of operability of equipment wherein a liquid is reacted with a gas in the presence of a solid catalyst.

Briefly, in the process of this invention a mass of catalyst particles are maintained in a reaction zone and the catalyst is spaced from the top and bottom of the zone. Liquid and gaseous reactants pass upwardly through the catalyst zone in contact with catalyst and at least a portion of the liquid is reacted. A portion of the liquid above the catalyst mass is recirculated by passing downwardly through an open ended recirculation conduit within the reactor. This is effected by forcing the liquid downwardly by use of a pump within the reactor, by disengaging gas from the liquid at the top of the conduit and preferably by both of these means. The downwardly flowing stream of liquid in the conduit which is generally a mixture of unreacted liquid, partly reacted liquid and fully reacted product is joined within the conduit by gaseous reactant and optionally liquid feed. This mixture is then discharged within the reaction zone below the catalyst mass, or at least the main body of catalyst mass. The presence of gas in the recirculation tube minimizes undesirable decomposition of the recirculating liquid during the time the liquid is under reaction conditions of temperature and pressure out of contact with the reactant gas in the main body of the reaction zone outside of the recirculation conduit. Thus in an appreciable portion of the recirculation conduit or draft tube the recirculating liquid is admixed with incoming hydrogen to prevent product and reactant degradation which very often occurs in the prior art recirculation conduits. The recirculation in the conduit can best be controlled with the use of a pump and since the draft tube contains incoming gas which lowers the fluid density of material in the tube, gas is disengaged from the upper portion of the recycle conduit in order to increase the fluid density of the liquid in the upper portion of the conduit and to better permit the pump to function. In order to further inhibit degradation, fine particulate catalyst can be carried ino the draft tube with the liquid feed and gaseous reactant, in which instance the particle size of such catalyst is preferably small enough to pass through the openings of the grid or other support for the main catalyst and pass upwardly through that catalyst mass. In addition to inhibiting degradation of product and reactants larger periods of operability are thus provided in continuous processes since the degradation products in many instances are resinous materials which foul the equipment, e.g. the product outlet, and the catalyst.

The apparatus comprises an external shell or reaction vessel in which an open ended generally vertical recycle conduit is positioned in spaced relation to the interior walls of the reaction vessel. A product outlet is provided and a grid to support the catalyst mass is positioned in the lower part of the reactor above the bottom opening of the recycle tube. An inlet conduit is provided for passing reactants directly into the recirculation tube in its upper portion. The recirculation tube has a pump outlet and gas disengaging means within its upper end.

For a better understanding of the invention reference is made to the drawing showing a partly cut-away side elevation of the apparatus comprising a shell or reactor 10, a grid 12 at the lower portion of the reactor supporting an expanded catalyst mass 14 containing large particle size catalyst 16 and small particle size catalyst 18. The grid 12 has openings 20 communicating with short risers 22. Caps 24 are positioned over the risers and sufficient space is provided in the assembly of grid, risers and caps to permit small particle size catalyst to flow therethrough but to obstruct passage of the large size catalyst. Grid 12 also has a central opening 26 in contact with recycle conduit 28. A product outlet 30 is at the upper part of the reactor 10 as well as motor 32 having a shaft 34 connected to centrificial pump 36. Recycle conduit 28 is open at its bottom end 38 and is of substantially uniform cross-section up to its flared upper portion 40. On the top end of recycle conduit 28 is an annular vertical flange 42 which forms a gas disengaging area. Flared portion 40 has a series of annular channels 44 for directing liquid downwardly in the recycle conduit. Each channel 44 has a ledge 46 at its top end. A feed inlet conduit 48 passes through a reactor wall and slopes downwardly toward recycle conduit 28 and is in fluid communication therewith below the flared portion 40.

The process is advantageously operated so that liquid feed, gas and optionally catalyst is continuously fed into the reaction zone while continuously recovering liquid product. Although the apparatus and process are suitable for many types of reactions it will be described for use in hydrogenation of liquid hydrocarbons.

Hydrogen feed into the reactor may be substantially pure hydrogen or part of a hydrogen-containing gas, such as recycle gas containing hydrogen as well as normally gaseous hydrocarbons or possibly inert gases such as nitrogen.

Hydrogen is introduced into the recycle conduit through the feed line in quantities suitable to the particular hydrogenation taking place in the reaction vessel and may for instance be introduced at rates of between about 1,000 and about 30,000 s.c.f per barrel of feed with hydrogen rates between about 2,500 and 10,000 s.c.f. per barrel per barrel of feed being preferred.

The liquid hydrocarbon feed is preferably a heavy hydrocarbon such as one wherein at least 20%, by volume boils in excess of 1000° F. Illustrative of suitable liquid hydrocarbon feedstocks which are advantageously hydrogenated in the process of this invention there can be mentioned: atmospheric tower bottoms, vacuum tower bottoms, or deasphalted gas oils derived from crude petroleum, natural tar and bitumen from tar sands and the like. The hydrocarbon feed advantageously has a boiling range from about 350° F. to about 1100° F. with more than about 50% boiling in excess of 650° F.

In a preferred embodiment of the invention the catalyst mass is expanded by the upward flow of fluids in the reactor, e.g. an ebullated bed as described in U.S. Patent 2,987,465 to E. J. Johanson. This permits the small size catalyst particles to work their way upwardly through the expanded bed of larger size catalyst after leaving the recycle conduit and form a layer or area above the larger particles or main body of catalyst in the ebullated bed.

The reaction vessel may be maintained under any suitable pressure such as between about 500 to about 4,000 p.s.i.g. partial pressure of hydrogen with between about 1,000 and 2,000 p.s.i.g. being preferred.

Temperatures in the reaction vessel may range over a wide range such as that of from about 650° F. to about 950° F., depending upon the particular hydrogenation reaction desired and other operating conditions chosen with temperatures between about 700° F. to about 830° F. being preferred.

Any hydrogenation or hydrocracking catalyst may be used in the reactor. Satisfactory results can be obtained with platinum, palladium, molybdenum, iron, nickel, cobalt, tungsten, and the like. In addition, any such suitable metal or its oxide or sulfide may be used in combination with an inert surfactive carrier or conventional acidic cracking material such as silica-alumina, silica-magnesia, silica-alumina-zirconia, acid treated clays and the like. For maximum utilization of a given reactor, catalyst generally is used in quantities sufficient to provide an average concentration of at least 15 and preferably at least 25 lbs. per cubic foot of contact zone.

Products which may be recovered from the reactions described hereinabove include normally gaseous products boiling below about 65° F., light fuel oil products boiling between about 400 and 650° F., and naphtha fraction boiling between about 65° F. and about 400° F. and heavy gas oil fraction boiling between 650° F. and 1000° F.

In use of an expanded catalyst mass or bed, the gross volume of the mass of catalyst expands without, however, a substantial quantity of the catalyst particles being carried away by the upflowing fluids, and therefore, a fairly well-defined upper level of randomly moving particles establishes itself in the upflowing liquid. Optionally a grid can also be placed at the top of the catalyst mass.

The catalyst can be in the form of beads, chips, pellets, lumps, or the like. The particle size of the catalyst can vary over a wide range when an expanded mass of catalyst is employed, illustratively the particle size can be from about 10 microns to about ¼ of an inch or more. When small particle size catalyst is also admixed with the feed prior to entry into the recycle conduit the larger catalyst can have a particle size of from about $\frac{1}{32}$ of an inch and greater such as that of from about $\frac{1}{32}$ of an inch to about ¼ of inch and preferably from about $\frac{1}{32}$ of an inch to about $\frac{1}{16}$ of an inch. The grid openings supporting the catalyst bed at the lower portion of the reactor can generally have an average dimension of less than about $\frac{1}{32}$ of an inch such as to prevent or generally inhibit the large particle size catalyst from passing downwardly therethrough but to permit the small sized catalyst to pass upwardly with the feed and circulating fluids. The small particle size catalyst which can be admixed with the hydrogen and hydrocarbon feed can be that of about 300 microns and smaller with that of about 50 to 150 microns being preferred. The term particle size as used herein refers to an average dimension of the particle. When employing catalyst in admixture with the liquid feed, the quantity of the small particle catalyst in the liquid feed can be in minor quantities such as from about 0.1 of a percent and less to as little as about 0.005 percent based on the quantity of liquid feed by weight and preferably about 0.01% to about 0.1% and particularly about 0.02 percent by weight of the liquid feed.

The pump can be positioned within the flared top of the recirculation conduit. In addition to maintaining circulation through the conduit even with the relatively large quantities of hydrogen entering the conduit below the pump impeller, the pump also permits the use of a recycle conduit of smaller internal cross section. The recycle pump is preferably a centrifugal pump for providing the liquid with a downward vector of force into the recycle conduit sufficient to overcome introduction of gas in the conduit below the pump. The hydrocarbon feed inlet to the recycle conduit is at an upper portion thereof but below the pump, so as to minimize the time that the circulating liquid is out of contact with the hydrogen and/or catalyst.

The liquid and gas pass upwardly through the catalyst bed and portions of the liquid and gas are removed from the reaction zone. Gas is further separated from liquid within the reaction zone in the area of the top of the recirculation conduit prior to discharge of liquid from the pump downwardly into the recirculation conduit. This can be accomplished by having a relatively large cross section area within the top of the recirculation conduit so circulation velocity is less than that of the bottom of the conduit to permit gas to escape upwardly prior to entry in the pump. This can be accomplished by providing the top of the recycle conduit, or an attachment thereto, with a flared top. The cross-sectional area of disengaging zone, e.g., a flared top, is preferably at least about ½ of the total cross section of the reaction vessel in order to afford sufficient surface for disengaging the hydrogen. While the area of the disengaging zone generally limits the amount of hydrogen in the recycle conduit in the area of the impeller, the recycle tube must, of course, have sufficient cross-sectional area to handle the recycled stream at the desired rate without excessive throttling. While the size of the recycle conduit is not critical, the recycle conduit preferably has a cross-sectional area of from about 1/1000 to 1/5 that of the cross section area of the reaction vessel.

The quality of liquid recycled through the recycle conduit may vary widely such as between about 1 and about 60 times the volume of feed oil introduced into the reactor by the incoming conduit. The velocity of the liquid in the recycle conduit is preferably maintained between about 3 and about 10 feet per second. Recycle rates of between about 5 and about 25 volumes of recycled liquid per volume of fresh feed are generally preferred.

The following example taken with the drawing further illustrates the invention. A vacuum residuum oil having the following properties is used as feed: Gravity of 8 API; sulfur of 3.5 wt. percent; less than 5% boiling below 975° F. in a continuous operation this above feed is introduced through feed line 48 together with 3,500 standard cubic feet of hydrogen per barrel of feed (s.c.f.b.). The hydrogen is introduced in the form of a hydrogen containing recycle gas stream containing 77 volume percent hydrogen. The crude together with hydrogen and recycle liquid from the top 40 of recycle conduit 28 is forced downwardly in the recycle conduit 28 due to the downward force provided by the pump 36 on recycle liquid. The mixture of hydrogen, crude feed and recycle liquid is discharged through the bottom opening 38 of recycle conduit 28 into the space below grid 12 in reactor 10. A liquid recycle ratio in the reactor of 20 times the liquid feed (crude) rate is provided. Temperature in the reactor is maintained at about 837° F., total pressure of about 2,000 p.s.i.g., hydrogen partial pressure of 1,500 p.s.i.g. and a space velocity at about 0.95 volume of liquid feed per hour per volume of reactor space. The mixture of liquid feed, hydrogen and recycle liquid after discharge from recycle conduit 28 passes upwardly through the spaces between grid risers 22 and caps 24, through the catalyst mass 14 of a hydrogenation catalyst wherein appreciable hydrogenation takes place. The liquid and gases then flow upwardly in the reaction where a substantial quantity of gas and some liquid product is removed from the reactor through product line 30. Liquid and some gas passes over flange 42 of the recycle conduit. The centrifugal pump 36 within the top portion 40 of the recycle conduit pulls liquid downwardly and discharges it from the pump into conduits 44 after being forced outwardly from the pump against the inner wall of conduits 44 and top ledges 46. Hydrogen and other gases escape upward above the pump in the gas disengaging zone within annular flange 42. The liquid product recovered through line 30 has an A.P.I. gravity of about 30, sulfur content of about 0.6 wt. percent and about 90% of the liquid product boils below 975° F. The process was run continuously for over a month without plugging. However, when operating the process under the same conditions but without hydrogen feed into draft tube 28, plugging occurred within 3 days.

The above example is repeated except that the liquid feed contains about 0.02% by weight of a hydrogenation catalyst 18 having an average particle size of about 100 microns. The large particle size catalyst supported on grid 12 has an average particle size of about 1/32 inch. The small particle size catalyst passes upwardly through the openings in the grid and the large particle size catalyst and part of this small catalyst forms an expanded mass above the top of the large catalyst mass. The process is run continuously over an appreciable period without plugging. The liquid product recovered from the reactor has an A.P.I. gravity of about 32, a sulfur content of about 0.4% by weight and at least 95% by volume of the feed is converted to products boiling below 975° F.

Optionally, the liquid feed, either alone or with small particle size catalyst can enter the reactor through an inlet, not shown in the drawing, at the bottom of reactor 10, below grid 12, instead of being passed into the draft tube along with gaseous reactant. In view of the recycling of liquid in the reactor, the process can be operated in a batchwise or intermittent fashion without continuous addition of liquid feed but wherein gaseous reactant alone is constantly fed into draft tube 28 from feed line 48.

What is claimed is:

1. Apparatus comprising a reaction vessel, a generally vertical recycle conduit disposed in said vessel and spaced from the interior walls thereof, said recycle conduit having a closed top and an open bottom, a pump inlet in said reaction vessel adapted to receive liquid within the upper part of the reaction vessel, a pump discharge outlet within the top of the recycle conduit for discharging liquid from said inlet into the recycle conduit, a feed line passing through a wall of the reaction vessel in fluid communication with an upper portion of the recycle conduit below the pump discharge outlet, said pump discharge outlet and said closed top of the recycle conduit preventing feed from passing out through the top of the recycle conduit and a product outlet passing through a wall of said reaction vessel.

2. Apparatus comprising a generally vertical reaction vessel, a generally vertical recycle conduit within said vessel and spaced from the interior walls thereof, said conduit having an enlarged and enclosed upper end in the upper portion of said reaction vessel and an open lower end in fluid communication with the lower portion thereof, means for withdrawing liquids from said reaction vessel, a pump having an inlet and an outlet within the reaction vessel, the pump inlet operatively positioned for receiving fluid within the upper part of said vessel and the outlet operatively positioned for forcing liquid through the upper enclosed end of the recycle conduit and downwardly through said recycle conduit and a fluid feed conduit operatively connected to an upper portion of the recycle conduit below the pump outlet, whereby feed entering the recycle conduit is caused to flow downwardly in the recycle conduit with the liquid.

3. Apparatus of claim 2 including a transverse grid at the bottom portion of said vessel above the open lower end of the recycle conduit adapted to support a catalyst bed.

4. Apparatus comprising a vertical reaction vessel, an open ended recycle conduit disposed centrally in said vessel and spaced from the interior walls thereof, the top end of said recycle conduit having a greater total internal cross section as compared to intermediate cross sections thereof, a pump mounted within the top portion of the recycle conduit on transverse ledges thereby forming a partition separating the top portion of the recycle conduit from the remainder of the recycle conduit below the pump, and adapted to draw liquid in the conduit, the pump inlet being sufficient below the top of the recycle conduit to permit gases to escape from a liquid within the expanded portion of the recycle conduit, a fluid feed inlet line passing through a wall of the reaction vessel and operatively connected to the vertical recycle conduit below the pump outlet and the partition thereby causing the fluid feed to flow downward in the vertical recycle conduit, a transverse grid adapted to support solid particles in the lower portion of the reactor above the recycle conduit bottom opening and dividing said reactor into two compartments, a central opening in said grid for passage of the recycle conduit therethrough, said reactor having a product outlet above said grid.

5. The apparatus of claim 4 wherein the portion of the fluid feed line passing through the reactor wall is above the pump outlet into the vertical recycle conduit.

6. The apparatus of claim 4 wherein the reactor vessel product outlet communicates with the reactor interior above the pump outlet.

7. The apparatus of claim 4 wherein the pump outlet discharges into a plurality of conduit openings.

8. An exothermic conversion process which comprises maintaining a mass of catalyst particles within a reaction zone, said mass spaced from the top and bottom of said zone, contacting a mixture of liquid and gaseous reactants with the catalyst by passing the reactants upwardly through said catalyst mass and exothermically reacting the same, continuously recirculating liquid through the reaction zone by passing a portion of liquid within the reaction zone above the catalyst mass downwardly in a confined stream within the reactor, providing the downwardly flowing stream with a downward vector of force effective to increase its downward velocity, introducing liquid reactant feed and gaseous reactant into said downwardly flowing stream at an elevation below that at which the downward vector of force is applied while simultaneously preventing the liquid reactant feed and gaseous reactant from moving upward beyond the elevation at which the downward vector of force is applied, and discharging said stream in the space below the said catalyst mass.

9. The process of claim 8 wherein the liquid feed is a heavy hydrocarbon oil and the gaseous reactant is hydrogen and wherein the recirculating stream of oil is maintained under hydrogenation conditions of temperature and pressure within said reaction zone.

10. The process of claim 9 wherein the catalyst particles are maintained in an expanded condition by movement of liquid upwardly therethrough at a velocity sufficient to expand the catalyst mass between about 10% and about 300% based on the unexpanded volume of said mass.

11. An exothermic conversion process which comprises maintaining a mass of catalyst within a reaction zone, said catalyst mass spaced from the top and bottom of said zone and in contact with a liquid and a gaseous reactant passing upwardly through the catalyst mass exothermically reacting the gas and liquid in contact with the catalyst mass and maintaining said mass in an expended condition by movement of the fluids upwardly therethrough at a velocity sufficient to expand said catalyst mass between about 10% and about 300% based on the unexpanded volume of said mass, separating a portion of the reaction product from the reactor, separating gas from the liquid in the reactor above the catalyst mass and passing liquid separated from gas downwardly within a confined stream of recirculating liquid providing the downwardly flowing stream with a downward vector of force effective to increase its downward velocity, mixing said recirculating liquid with a feed of reactant liquid and gas at an elevation below that at which the downward vector of force is applied and preventing upward flow of said reactant liquid and gas and causing said reactant liquid and gas and said recirculating liquid to move downwardly in a confined stream and discharging said stream in the space below said catalyst bed.

12. An exothermic conversion process which comprises maintaining a mass of catalyst of a first particle size within a reaction zone, said catalyst mass spaced from the top and bottom of said zone and in contact with a liquid and a gaseous reactant passing upwardly through the catalyst mass and maintaining said mass in an expanded condition by movement of reactant fluids upwardly therethrough at a velocity sufficient to expand the catalyst mass between about 10% and about 300% based on the unexpanded volume of said mass, maintaining said reaction zone under reaction conditions of temperature and pressure and reacting liquid and gaseous reactants in contact with said catalyst mass, separating a portion of the reacted fluids from the reactor, separating gas from the liquid in the reactor above the catalyst mass of first size and passing said liquid separated from gas downwardly within a confined stream in the reactor providing the downwardly flowing stream with a downward vector of force effective to increase its downward velocity, at an elevation below that at which the downward vector of force is applied, mixing said downwardly flowing liquid under reaction conditions of temperature and pressure and out of contact with reactor fluids about said stream with liquid feed, gaseous reactant and a second particle size catalyst having a substantially smaller average diameter than said first particle size catalyst and preventing the upward flow of said liquid feed, gaseous reactant and second particle size catalyst thereby causing the feed reactant and second catalyst to move downwardly in the confined stream while mixing with the downwardly flowing liquid, discharging said mixture within the reactor below the catalyst mass of first particle size.

13. A process of claim 12 wherein the liquid reactant is a heavy hydrocarbon, the gaseous reactant is hydrogen, the first particle size catalyst has an average dimension of from about 1/32 of an inch to about 1/4 of an inch, the quantity of second particle size catalyst in the liquid feed is from about 0.01% to about 0.1% by weight of the feed and the average dimension of the second particle size catalyst is from about 50 microns to 150 microns.

14. An exothermic conversion process which comprises maintaining a mass of catalyst particles within a reaction zone, said mass spaced from the top and bottom of said zone, contacting a mixture of liquid and gaseous reactants with the catalyst by passing the reactants upwardly through said catalyst mass and exothermically reacting the same, continuously recirculating liquid through the reaction zone by pumping a portion of liquid within the reaction zone above the catalyst mass downwardly in a confined stream with the reactor, thereby providing the downwardly flowing stream with a downward vector of force effective to increase its velocity at an elevation below that which the pumping is applied, introducing gaseous reactant into said downwardly flowing confined stream at the elevation below that which the pumping is applied, preventing upward flow of said gaseous reactant and discharging said confined stream in the space below the said catalyst mass.

References Cited

UNITED STATES PATENTS

| | | | |
|---|---|---|---|
| 2,890,251 | 6/1959 | Flavin et al. | 23—288 |
| 3,151,060 | 9/1964 | Garbo | 208—143 |
| 3,188,286 | 6/1965 | Van Driesen | 208—143 |

DELBERT E. GANTZ, *Primary Examiner.*

SAMUEL P. JONES, *Examiner.*

UNITED STATES PATENT OFFICE
CERTIFICATE OF CORRECTION

Patent No. 3,354,079            November 21, 1967

Roger P. Van Driesen

It is certified that error appears in the above identified patent and that said Letters Patent are hereby corrected as shown below:

In the heading to the printed specification, line 6, for "a corporation of New Jersey" read -- a corporation of Delaware --.

Signed and sealed this 24th day of June 1969.

(SEAL)
Attest:

Edward M. Fletcher, Jr.            WILLIAM E. SCHUYLER, JR.
Attesting Officer                      Commissioner of Patents